(12) United States Patent  
Kawabata et al.

(10) Patent No.: US 7,541,108 B2
(45) Date of Patent: Jun. 2, 2009

(54) SOLID POLYMER FUEL CELL (75) Inventors: Norihiko Kawabata, Osaka (JP); Takashi Morimoto, Osaka (JP); Hiroki Kusakabe, Osaka (JP); Toshihiro Matsumoto, Osaka (JP); Yoshiki Nagao, Osaka (JP)

(73) Assignee: Panasonic Corporation, Osaka (JP)

( * ) Notice: Subject to any disclaimer, the term of this patent is extended or adjusted under 35 U.S.C. 154(b) by 72 days.

(21) Appl. No.: 11/914,809

(22) PCT Filed: Apr. 20, 2007

(86) PCT No.: PCT/JP2007/058589

§ 371 (c)(1), (2), (4) Date: Nov. 19, 2007

(87) PCT Pub. No.: WO2007/123191

PCT Pub. Date: Nov. 1, 2007

(65) Prior Publication Data

US 2009/0029217 A1    Jan. 29, 2009

(30) Foreign Application Priority Data

Apr. 21, 2006 (JP) ................ 2006-117590

(51) Int. Cl.
 H01M 8/02 (2006.01)
 H01M 8/10 (2006.01)
(52) U.S. Cl. .......................... 429/35; 429/30
(58) Field of Classification Search .......... 429/30, 429/35
 See application file for complete search history.

(56) References Cited

U.S. PATENT DOCUMENTS

| 5,543,241 | A | 8/1996 | Nishioka et al. |
| 5,686,200 | A | 11/1997 | Barton et al. |
| 2004/0023090 | A1* | 2/2004 | Pearson et al. .............. 429/30 |
| 2004/0157106 | A1 | 8/2004 | Sugiura et al. |

FOREIGN PATENT DOCUMENTS

DE    10301052    7/2004

(Continued)

OTHER PUBLICATIONS

U.S. Appl. No. 11/815,121 to Kawabata et al., filed Jul. 31, 2007.

(Continued)

*Primary Examiner*—Gregg Cantelmo
(74) *Attorney, Agent, or Firm*—Greenblum & Bernstein, P.L.C.

(57) ABSTRACT

It is an object of the present invention to provide a means for integrating an MEA and a pair of separators and regulate their positions without using parts that are specifically dedicated for position regulation use. More specifically, the present invention provides a polymer electrolyte fuel cell including a frame-integrated MEA, a separator having a channel for supplying and releasing a fuel gas, and a separator having a channel for supplying and releasing an oxidizer gas, and, in this fuel cell, the frame body of the frame-integrated MEA has a plurality of projections having a hook-shaped tip on both planes of the frame body and each separators has a plurality of stepped parts, and the projections on the frame body and the stepped parts on the pair of separators are integrated by fitting together with each other.

7 Claims, 10 Drawing Sheets

FOREIGN PATENT DOCUMENTS

| | | |
|---|---|---|
| JP | 59-075578 | 4/1984 |
| JP | 61-161671 | 7/1986 |
| JP | 61-206176 | 9/1986 |
| JP | 7-029580 | 1/1995 |
| JP | 2000-012067 | 1/2000 |
| JP | 2004-241208 | 8/2004 |
| JP | 2005-142000 | 6/2005 |
| WO | 96/41392 | 12/1996 |

OTHER PUBLICATIONS

English language Abstract of JP 59-075578.
English language Abstract of JP 61-206176.
English language Abstract of JP 61-161671.
English language Abstract of JP 7-029580.
English language Abstract of JP 2000-012067.
English language Abstract of JP 2005-142000.
English language Abstract of DE 10301052, Jul. 22, 2004.

* cited by examiner

SOLID POLYMER FUEL CELL

TECHNICAL FIELD

The present invention relates to a solid polymer fuel cell using a solid polymer electrolyte.

BACKGROUND ART

A fuel cell using a polymer electrolyte is used for portable power supply, power supply for electric cars, home cogeneration systems and so on. A fuel cell using a polymer electrolyte generates electric power and heat at the same time by causing a fuel gas containing hydrogen and an oxidizer gas containing air such as oxygen, to electrochemically react with each other.

A fuel cell using a polymer electrolyte generally includes a polymer electrolyte membrane which selectively transports hydrogen ions, and a pair of electrodes which sandwich the polymer electrolyte membrane. The electrodes include a catalyst layer which is primarily composed of carbon particles supporting a platinum group metal catalyst, and a gas diffusion layer which is formed outside the catalyst layer and which is both breathable and electronically conductive.

To prevent the supplied fuel gas and oxidizer gas from leaking outside or to prevent the two gasses from mixing with each other, a gas sealant and gaskets are provided around the electrodes so as to sandwich the polymer electrolyte. The sealant and gaskets are assembled in advance integral with the electrodes and the polymer electrolyte membrane. This assembly will be referred to as an "MEA (Membrane Electrode Assembly)."

Conductive separators are placed on both planes of an MEA to mechanically hold the MEA and electrically connect the MEA with neighboring MEAs in series. A channel is formed on the face where the separator and the MEA contact, to supply a reactive gas to electrode surface and carry away the water produced and surplus gas. The channel may be provided apart from the separators, but, usually, a groove is provided on the surfaces of the separators as a channel. Moreover, generally, a plurality of battery cells, in which each cell is made up of an MEA and a pair of separators, are stacked together and the MEAs are electrically connected in series, to increase voltage and make a cell stack of practical use.

When a battery cell is made by combining an MEA and a pair of separators, if displacement occurs between the electrode surface of an MEA and the channel surface of a separator, the effective reaction area is reduced and a desired voltage cannot be obtained. Furthermore, when a plurality of battery cells are stacked together, an MEA and a pair of separators making up a battery cell are preferably integrated so as to prevent displacement between MEAs and separators.

In order to regulate the positions of the MEA and a pair of separators of a battery cell and integrate these components, a method has been proposed of inserting positioning pins in through-holes provided in the MEA and the pair of separators in places other than the reaction surfaces and fastening the positioning pins with retaining rings to prevent the pins from falling (see Patent Document 1).

A proposal of integrating an MEA and a pair of separators by clipping perimeter edges of the MEA and the separators using a clip-like part (see Patent Document 2) or a proposal of fitting a pair of separators, between which an MEA is sandwiched, is fitted with each other via resin suction cups (see Patent Document 3), has been made.

Patent Document 1: Japanese Patent Application Laid-Open No. 2000-012067

Patent Document 2: Japanese Patent Application Laid-Open No. 2004-241208

Patent Document 3: Japanese Patent Application Laid-Open No. 2005-142000

DISCLOSURE OF INVENTION

Problems to be Solved by the Invention

As described above, since the positions of the MEA and a pair of separators are conventionally regulated using fastening parts such as positioning pins or clips, there are problems that the number of necessary parts increases, the manufacturing cost increases, assembly work is complicated and manufacturing lead time is extended.

Furthermore, when positioning pins or the like are used, since a pin needs to be fastened using a retaining ring or the like, separators need to have a certain thickness. Furthermore, fixing with fastening parts produces a load of pressure, and so separators need to have a certain thickness. Therefore, these methods are difficult to apply to fuel cells which are generally demanded to be miniaturized.

Moreover, since fixing with positioning pins requires the size of a hole in which a pin is inserted to be set with a certain margin with respect to the pin size, the position displacement cannot be completely eliminated.

It is therefore an object of the present invention to provide a means for integrating an MEA and a pair of separators and regulate their positions without using dedicated parts for position regulation use. This makes it possible to suppress position displacement when battery cells are stacked, so that a polymer electrolyte fuel cell that can produce stable voltage can be made by simple process.

Furthermore, concerning a fuel cell stack including two or more stacked battery cells, if a position displacement occurs between battery cells, the area of contact between neighboring separators reduces and required voltage cannot be obtained due to increased contact resistance. Therefore, it is an object of the present invention to provide a means for regulating the positions of battery cells and integrating a fuel cell stack without using dedicated parts for fastening use.

Means for Solving the Problem

A first aspect of the present invention relates to a fuel battery cell of a polymer electrolyte fuel cell, and this will be described later in detail.

[1] For example, the first aspect of the present invention may provide a polymer electrolyte fuel cell with: a frame-integrated membrane electrode assembly including a frame body in which a gas channel opening is formed, a polymer electrolyte membrane provided inside the frame body, a pair of electrodes sandwiching the polymer electrolyte membrane, and a sealant enclosing the gas channel opening and the electrodes; a separator having a channel for supplying and releasing a fuel gas to and from one of the pair of electrodes; and a separator having a channel for supplying and releasing an oxidizer gas to and from the other one of the pair of electrodes, and, in this fuel cell, the frame body has a plurality of projections having a hook-shaped tip on both planes of the frame body and each separator has a plurality of stepped parts; and the projections of the frame body and the stepped parts of the pair of separators are integrated by fitting together with each other.

[2] In the fuel cell described in [1], the projections may be located in the vicinity of the gas channel opening.

[3] In the fuel cell described in [1], the hook-shaped part at the tip of the projection is oriented inward of the frame body.

[4] In the fuel cell described in [1], the pressure of the fuel gas and the pressure of the oxidizer gas flowing through the channel each of the separators are different, and the plurality of projections having a hook-shaped tip formed on a plane of the frame body facing the separator where the gas of the higher pressure flows, are placed further inside the frame than the plurality of projections having a hook-shaped tip formed on a plane of the frame body facing the separator where a gas of a lower pressure flows.

A second aspect of the present invention relates to a polymer electrolyte fuel cell stack including two or more stacked fuel cells.

[5] For example, the second aspect of the present invention may be a polymer electrolyte fuel cell stack including two or more stacked fuel cells in which each cell having: a frame-integrated membrane electrode assembly including a frame body in which a gas channel opening is formed, a polymer electrolyte membrane provided inside the frame body, a pair of electrodes sandwiching the polymer electrolyte membrane, and a sealant enclosing the gas channel opening and the electrodes; a separator having a channel for supplying and releasing a fuel gas to and from one of the pair of electrodes; and a separator having a channel for supplying and releasing an oxidizer gas to and from the other one of the pair of electrodes, and, in this stack, the frame body has a plurality of projections having a hook-shaped tip on both planes of the frame body and each separator has a plurality of stepped parts, and the projections of the frame body and the stepped parts of the pair of separators are integrated by fitting together with each other.

[6] In the fuel cell stack described in [5]: the fuel cell stack includes a fuel cell A and a fuel cell B stacked neighboring each other; each of the frame bodies of the fuel cell A and the fuel cell B has a plurality of second projections having a hook-shaped tip and separator of the fuel cell B has a plurality of second stepped parts; and the second projections on the frame body of the fuel cell A and the second stepped parts of the fuel cell B are integrated by fitting together with each other.

[7] In the fuel cell stack described in [5]: the fuel cell stack includes a fuel cell A and a fuel cell B stacked neighboring each other; each of the frame bodies of the fuel cell A and fuel cell B has a plurality of second projections and a plurality of notches, said projections and notches being arranged alternately; and the second projections and notches of fuel cell A fit together with the second projections and notches of fuel cell B.

Advantageous Effect of the Invention

In the fuel cell of the present invention, an MEA and a pair of separators constituting a battery cell are integrated in regulated positions, so that stable voltage is produced. Moreover, the fuel cell of the present invention can be made in a simple manner without using dedicated parts, so that the present invention provides a low-cost, high performance polymer electrolyte fuel cell.

BEST MODE FOR CARRYING OUT THE INVENTION

1. The fuel cell of the present invention:

Features of the fuel cell of the present invention include integrating a frame-integrated MEA and a pair of separators. A frame-integrated MEA and separators are integrated by fitting the hook-shaped tips of the projections provided in the frame body of the frame-integrated MEA with the stepped parts provided in the separators together. The details will be described later.

The frame-integrated MEA:

The frame-integrated MEA includes a frame body including gas channel openings, a polymer electrolyte membrane provided inside the frame body, a pair of electrodes sandwiching the polymer electrolyte membrane, and sealants enclosing the gas channel openings and the electrodes, and they are all integrated into one.

Gas channel openings are formed in the frame body. Gasses that flow through the gas channel openings include the fuel gas and the oxidizer gas, and channel openings are provided separately for each gas. Furthermore, channel openings where the coolant flows, may be formed in the frame parts of the frame body.

The material of the frame body is preferably a olefin-based resin which has high chemical resistance and allows little elution (e.g., polypropylene, polyethylene, etc), so as to reduce elution and extend the life of the battery. Moreover, the material of the frame body requires high temperature resistance, because the temperature in the environment in which the fuel cell is used is approximately 60 to 80 degrees. Therefore, polypropylene is a more preferable material for the frame body.

The polymer electrolyte membrane is not limited to certain kinds as long as it is a thin, film membrane that allows hydrogen ions to pass and blocks electrons. A fluororesin polymer membrane is usually used.

The pair of electrodes sandwiching the polymer electrolyte membrane consist of an oxygen electrode (or "cathode") to which an oxidizer is supplied and a fuel electrode (or "anode") to which a fuel gas is supplied. These electrodes are not limited to certain kinds and may use carbon supporting catalysts such as platinum.

The sealants are components for preventing gases that flow through the gas channel openings or electrodes from leaking outside and preventing outer gasses from entering the gas channel openings or electrodes. The material of the sealant is usually rubber or the like.

Moreover, a feature of the present invention is that a projection that has a hook-shaped tip is formed in the frame body of the frame-integrated MEA. "A hook-shaped tip" here means that the tip of each projection serves as a claw. The projection may be provided in one plane or in both planes (i.e. anode side and cathode side) of the frame but is preferably provided on both sides. The number of projections is not particularly limited but needs to be at least two. The hook-shaped part at the tip of the projection formed in the frame body can be fitted together with the step of the stepped part of the separator (which will be described later).

The height of the projection is usually less than the thickness of the separator. When the separator is thin, the projection on the frame body may stick out from the separator. When such fuel battery cells are stacked to form a battery stack, a hole may be provided on the separator of a battery cell to elude projection sticking out from the separator of the neighboring battery cell.

Figure 9:
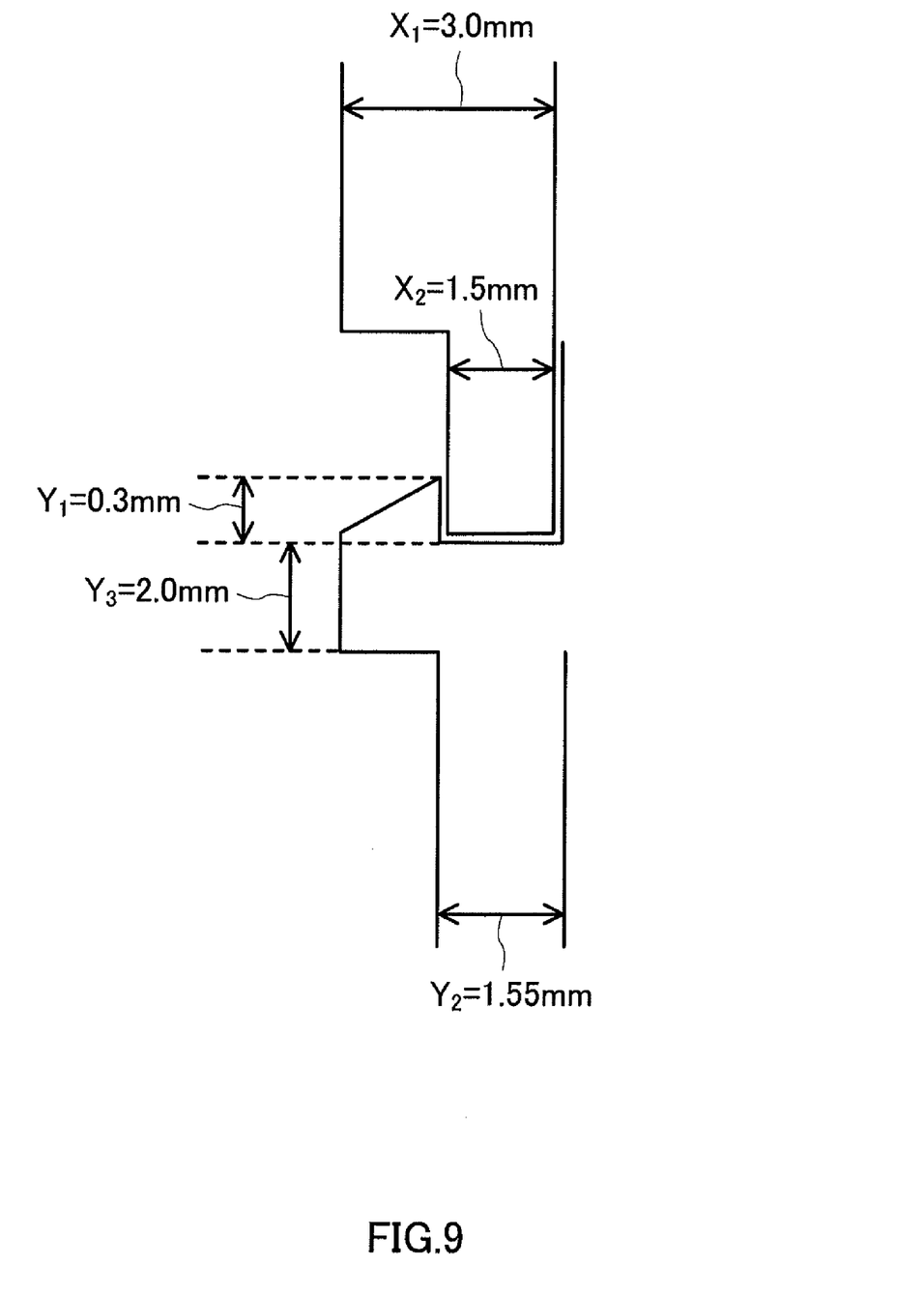
FIG. 9 shows the structure of the projection of the frame body and the stepped part of the separator of the frame-integrated MEA made according to Embodiment 1.

As shown in FIG. 9 concerning the hook-shaped part at the tip of the projection (that is, "claw"), the height of the claw, Y1, is preferably set approximately ⅕ of Y2, which is the height of projection up to the claw.

The projection is preferably provided in position near the gas channel opening. Furthermore, the hook-shaped part at the tip of the projection is preferably oriented toward a nearby sealant and is preferably oriented toward the inside of the frame of the frame body, so that the sealing effect of the sealant improves.

Figure 3:
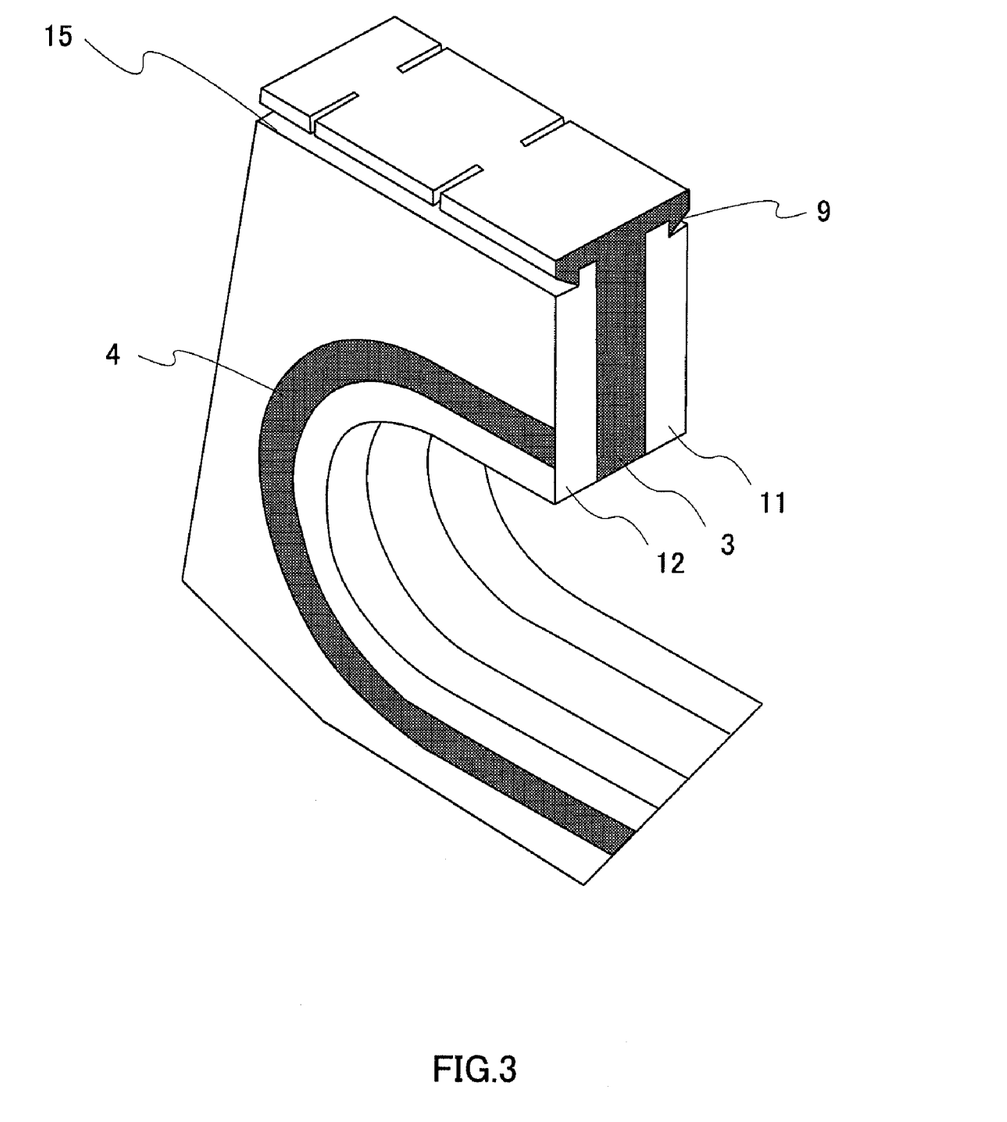
FIG. 3 is a partially detailed cross-sectional perspective view of the vicinity of the projections of the frame body and the stepped parts of the separators when a fuel cell according to Embodiment 3 is assembled.

Furthermore, the projection may be provided inside the frame of the frame body (e.g., in the vicinity of the perimeter) (see projection 9 in FIG. 1) or may be arranged at the edges of the perimeter of the frame of the frame body (see projection 9 in FIG. 3).

Figure 4:
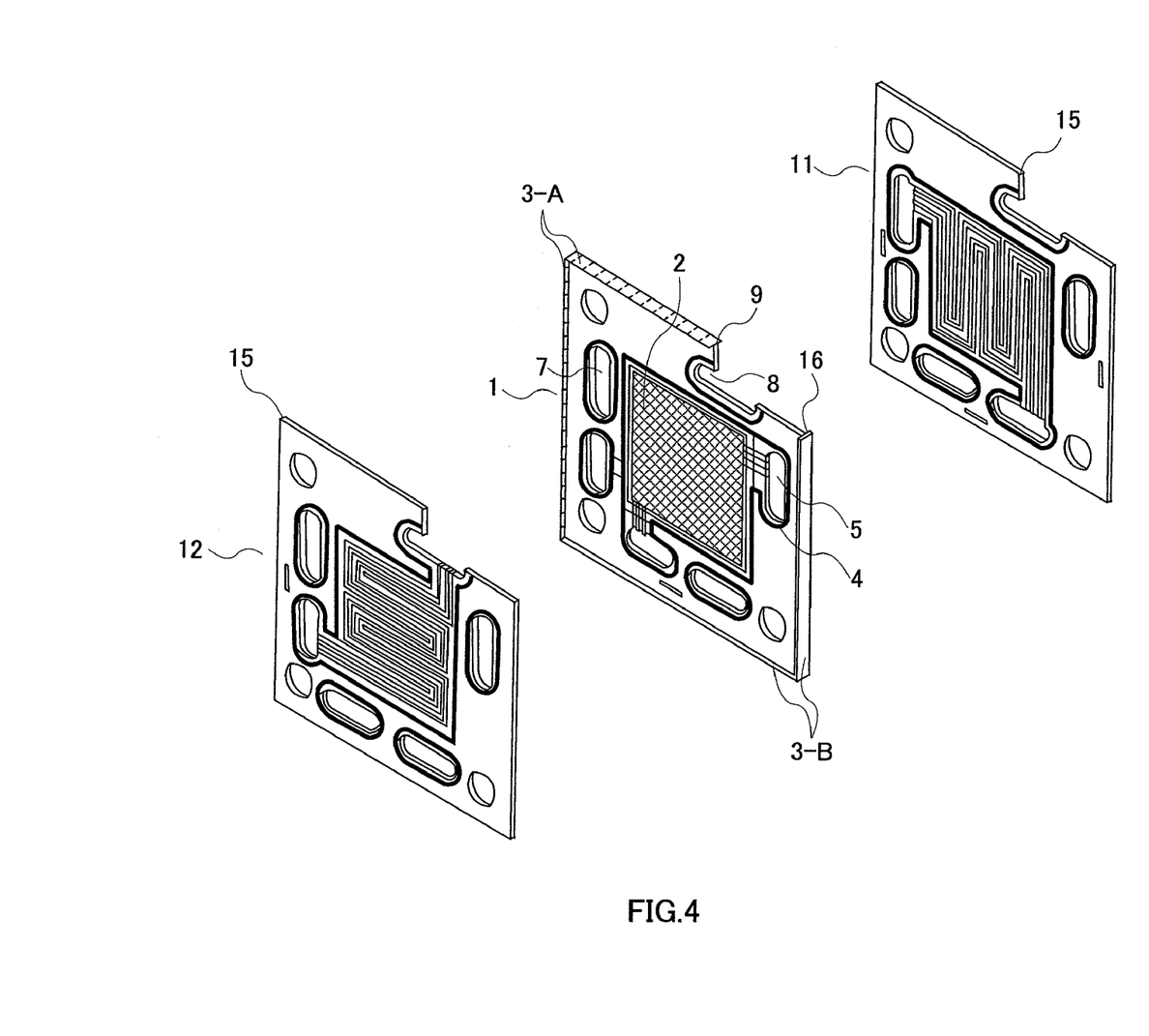
FIG. 4 is an exploded perspective view of a fuel cell according to Embodiment 4, showing a frame-integrated MEA, anode-side separator and cathode-side separator.

Moreover, the projection may also be arranged at only a part of the periphery of the frame of the frame body. For example, as shown in FIG. 4, in the case of a rectangular frame body, projections 9 (projections having a hook-shaped tip) may be provided in only two of the four sides. If a positioning stopper of high rigidity is arranged in the other two sides, the separators can be more reliably fixed to the frame-integrated MEA (details will be described later with reference to FIG. 4).

As described above, projection is arranged on one plane or on both plane of the frame body. When projections are arranged on both planes, the positions of the projections may be shifted from each other. When the positions of the projections are shifted, the projection provided on the plane where the higher pressure one of the fuel gas and the oxidizer gas flowing through the channels flows, is preferably located closer to the sealant (usually arranged further inside the frame), so that the sealing effect of the sealant improves.

Furthermore, a pin-shaped positioning projection (which does not have a hook-shaped tip) may be formed in the frame body of the frame-integrated MEA. The pin-shaped positioning projection is inserted into a positioning hole (described later) provided in the separators.

The separators:

A groove where the fuel gas flows is formed in one of a pair of separators included in the battery cell of the present invention, and the fuel gas is supplied to or released from the fuel electrode through that groove. A groove where the oxidizer gas flows is formed in the other one of the pair of separators included in the battery cell of the present invention, and the oxidizer gas is supplied to or released from the air electrode through that groove.

The separator needs only to be made of a conductive material and is normally made of a carbon material but may also be made of a pressed metal plate or the like. When pressed metal plate is used as separator, the stepped part (which will be described later) may be formed in a twisted shape.

The thickness of the separator is approximately 2 to 3 mm but can be made thinner.

Stepped part is provided in the separator so as to fit together with the hook-shaped part at the tip of the projection on the frame body. Stepped part is formed on the opposite side surface of the separator surface where the groove for the gas channels is formed.

If projection is formed inside the frame of the frame body, the stepped part on the separator may be "stepped hole" (see stepped hole 10 in FIG. 1) and when projection is formed at edge of the frame body, the stepped part on the separator may be "steps provided in the edge" (see stepped part 15 in FIG. 3).

Figure 2:
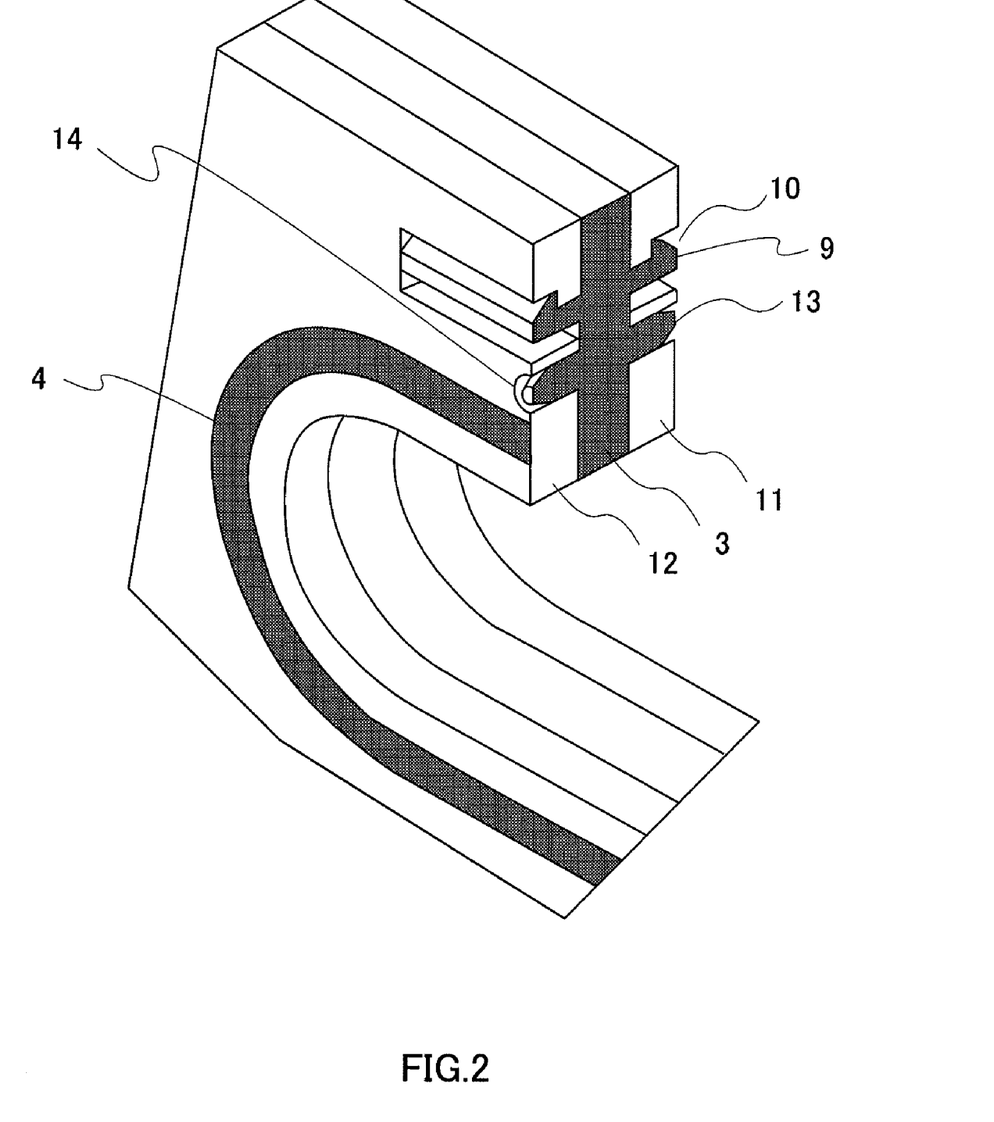
FIG. 2 is a partially detailed cross-sectional perspective view of the vicinity of the projections of the frame body, the stepped holes and positioning holes of the separators, when a fuel cell according to Embodiment 2 is assembled.

Furthermore, when the frame body has pin-shaped positioning projection, positioning hole are formed in the separator (see positioning hole 14 in FIG. 2). When the pin-shaped positioning projection of the frame body is inserted in the positioning hole of the separator, the positions of the MEA and the separator become more precise.

The battery cell of the present invention is assembled and integrated by preparing the above described frame-integrated MEA and pair of separators; stacking the frame-integrated MEA and the pair of separators so as to sandwich the frame-integrated MEA between the pair of separators; and pressing the stack in the stacking direction so that the projection in the frame body is fitted together with the stepped part in the separators. If the frame body has pin-shaped projection and the separator has positioning hole, the pin-shaped projection is inserted in the positioning hole.

In this way, since the battery cell of the present invention is integrated with separators using projections provided in the frame of the frame-integrated MEA, there is no need to provide dedicated parts that are specifically for integration use and the work for the integration is extremely simple. Moreover, since the positioning of the separators and the frame-integrated MEA is determined with the reference to projections in the frame body sandwiched between a pair of separators, the positioning of the separators and the frame-integrated MEA can be more precise.

2. The fuel cell stack of the present invention:

The fuel cell stack of the present invention has a feature of stacking a plurality of fuel battery cells of the present invention. As described above, according to the fuel battery cell of the present invention, since a frame-integrated MEA and a pair of separators are integrated into one and their positions are regulated, when fuel battery cells are stacked, there is no displacement between the frame-integrated MEA and a pair of separators in any battery cell.

Moreover, according to the fuel cell stack of the present invention, a plurality of fuel battery cells that are stacked may be integrated. Thus, the frame bodies of neighboring fuel battery cells (battery cell A and battery cell B) in the fuel cell stack may have a plurality of second projections having a hook-shaped tip and the separators may have a plurality of second stepped parts.

The second projection of the frame body of fuel cell A can be fitted together with the second stepped part of a separator of fuel cell B. Therefore, An integrated fuel cell stack can be provided by stacking a plurality of battery cells and pressing the cells in the stacking direction so that the second projections of the frame body of fuel cell A fit together with the second stepped parts of in a separator of fuel cell B (see FIG. 5).

Furthermore, when battery cells are stacked, even if displacement of the positions of the frame-integrated MEA and a pair of separators is prevented, position displacement may occur between the battery cells. When position displacement occurs between battery cells, the contact area with the separators of the neighboring battery cells decreases, which leads to the problem that required voltage cannot be obtained due to increased contact resistance.

Therefore, the neighboring fuel battery cells (battery cell A and battery cell B) in the fuel cell stack of the present invention may be constructed in such that the frame body of battery cell A has second projections and notches alternately extended in the stacking direction and the frame body of battery cell B has notches and second projections alternately that engage with the second projections and notches of the frame body of battery cell A. Here, the tip of the second projections may be hook-shaped.

Figure 6:
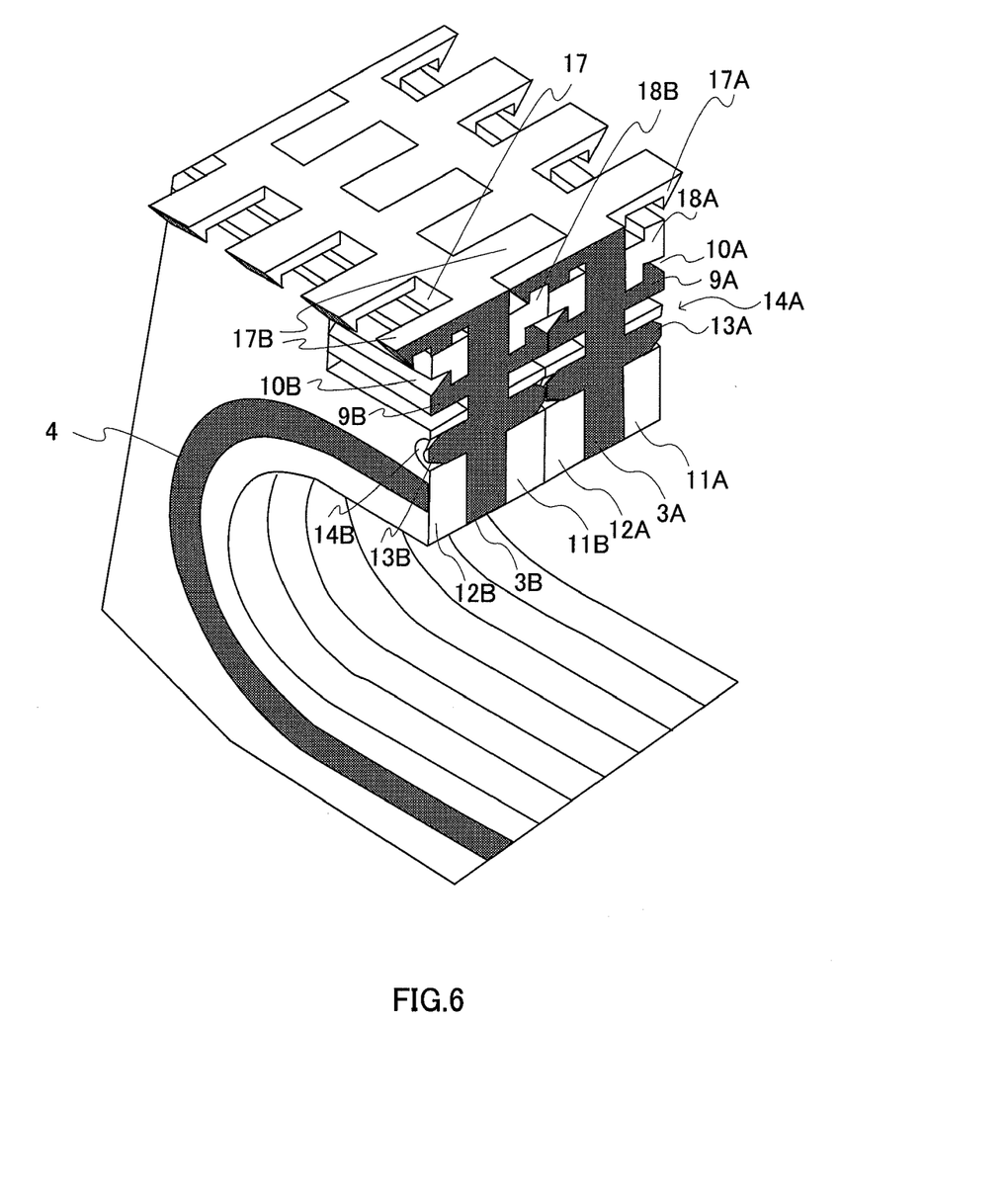
FIG. 6 is a cross-sectional perspective view of two battery cells of a fuel cell stack according to Embodiment 6 stacked together, showing that battery cells are integrated and the projections are fitted together to regulate the positions.

In this way, by fitting together the second projections and notches of neighboring battery cells, a plurality of battery cells can be stacked without causing position displacement (see FIG. 6).

The fuel cell stack of the present invention may include an end unit placed at either end of a plurality of stacked fuel battery cells (i.e. fuel cell stack) of the present invention.

The end unit includes a collector plate and a resin gas supply/release manifold integrally assembled. It is preferable to fit a preassembled end unit into the stack and make it part of the fuel cell stack.

Figure 7:
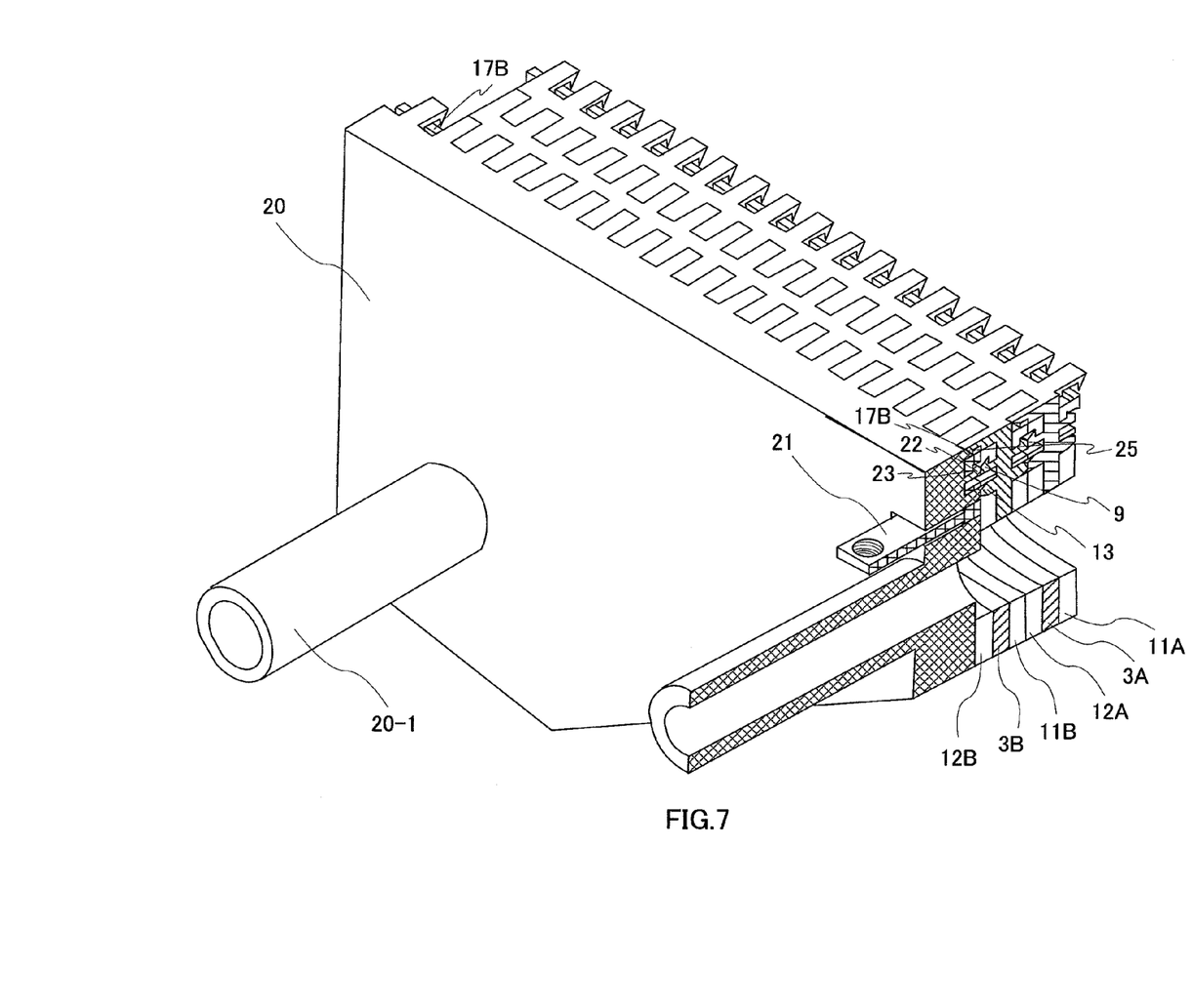
FIG. 7 is a cross-sectional perspective view of a fuel cell stack according to Embodiment 7, showing that an end unit made up of a collector plate and a gas supply/release manifold is integrated with a battery cell stack.

For example, if stepped notches and projections are formed alternately in the gas supply/release manifold of the end unit and the stepped notches and projections are formed alternately in the frame body of the battery cell of the outermost layer of the fuel cell stack, it is possible to fit the end units into the fuel cell stack and integrate them (see FIG. 7).

Embodiments of the present invention will be explained below in detail with reference to the accompanying drawings.

Embodiment 1

Figure 1A:
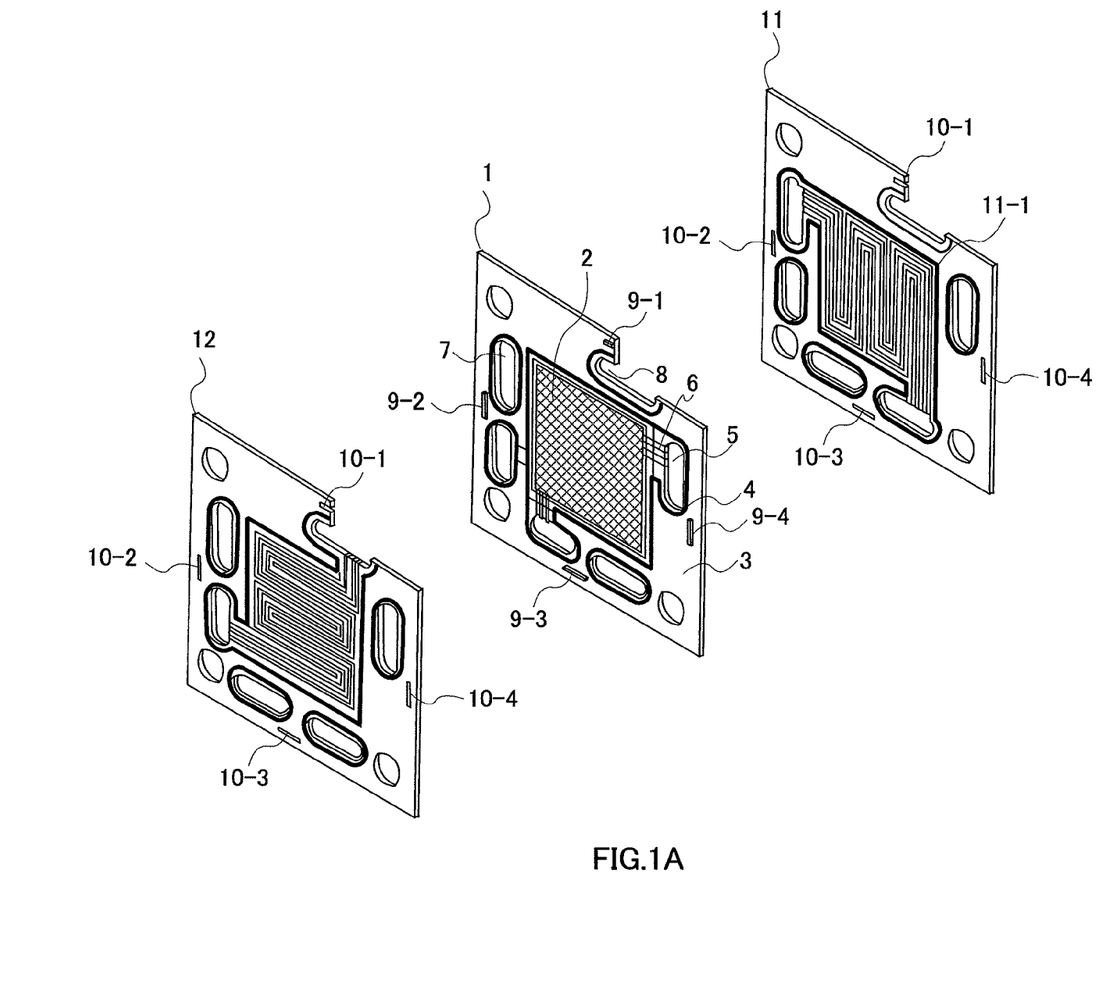
FIG. 1A is an exploded perspective view of a fuel cell according to Embodiment 1, showing a frame-integrated MEA, an anode-side separator and a cathode-side separator.

FIG. 1A is an exploded perspective view of the battery cell of Embodiment 1 viewed from the cathode electrode side. Frame-integrated MEA 1, anode-side separator 11 and cathode-side separator 12 are shown.

Frame-integrated MEA 1 includes frame body 3 and MEA 2 provided inside the frame of frame body 3.

The size of MEA 2 is approximately 150 mm long and 150 mm wide. Frame body 3 is placed around MEA 2. The outer size of frame body 3 is approximately 220 mm long and 220 mm wide. The material of frame body 3 is resin such as polypropylene. Frame body 3 can be manufactured through insertion molding using MEA 2 as an inserted part. Furthermore, seal 4 is formed in frame body 3 through two-color molding of fluororubber. Seal 4 on the cathode surface encloses the periphery of the cathode side electrode and cathode side gas channel opening 5 to prevent leakage of gas. However, seal 4 on the cathode side is not provided on periphery of part 6 communicating the cathode side electrode and gas channel opening 5 that supplies/releases an oxidizer gas to/from the cathode side electrode.

In the same way, the seal on the anode surface encloses the periphery of the anode side electrode and anode side gas channel opening 7 to prevent leakage of gas. However, the seal on the anode surface is not provided on periphery of the part communicating the anode side electrode and gas channel opening 7 that supplies/releases a fuel gas to/from the anode side electrode.

A seal is formed to enclose the perimeter of the channel opening 8 for cooling water to prevent cooling water from leaking outside.

Moreover, four projections 9 (9-1 to 9-4) having hook-shaped tips are integrally molded in frame body 3. Projections 9 are preferably provided in the vicinity of the gas channel opening (5 or 7).

Anode-side separator 11 is provided with groove 11-1 in which the fuel gas flows. Likewise, cathode-side separator 12 is also provided with a groove in which the oxidizer gas flows.

Separators 11 and 12 are provided with stepped holes 10 (10-1 to 10-4). The positions of stepped holes 10 correspond to the positions of projections 9 formed in the frame body and the holes 10 are also shaped so that projections 9 can be inserted.

Figure 1B:
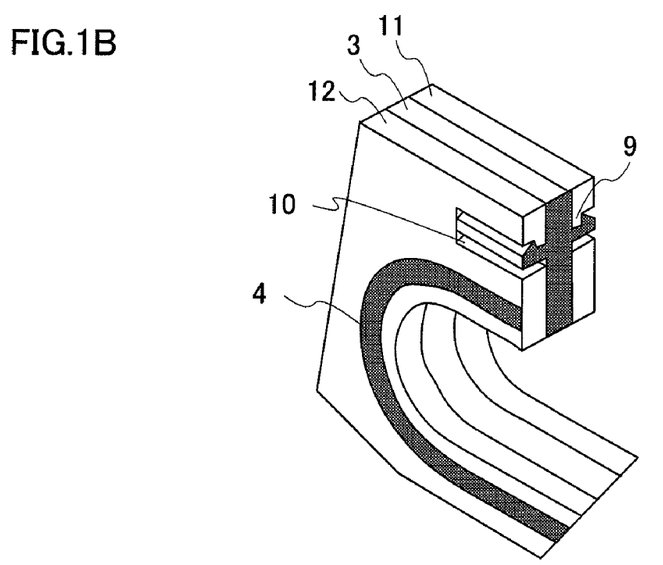
FIG. 1B is an enlarged cross-sectional view of the vicinity of the projections of the frame body and the stepped holes on the separators, when the fuel cell according to Embodiment 1 is assembled, showing the hook-shaped part of the projections oriented outward.
Figure 1C:
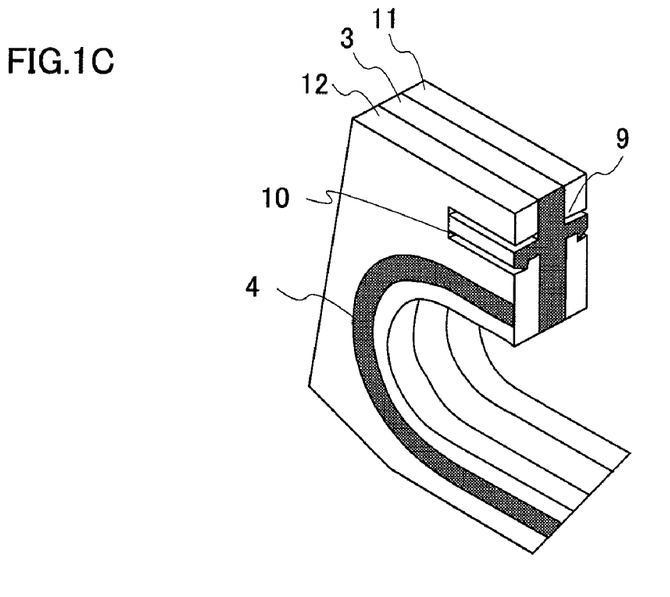
FIG. 1C is an enlarged cross-sectional view of the vicinity of the projections of the frame body and the stepped holes of the separators when the fuel cell according to Embodiment 1 is assembled, showing the hook-shaped part of the projections oriented inward.

When anode-side separator 11 and cathode-side separator 12 are stacked, sandwiching frame-integrated MEA 1, and are pressed in the stacking direction, projections 9 having a hook-shaped tip fit in stepped holes 10, and the three parts (frame-integrated MEA 1, separator 11 and separator 12) are integrated into one to form a battery cell. FIG. 1B and FIG. 1C are enlarged views showing the state of projection 9 and stepped hole 10 of an integrated battery cell. As shown in FIG. 1B and FIG. 1C, the hook-shaped part of the tip of projection 9 of frame body 3 and the step of separators 11 and 12 are fitted together and integrated. The hook-shaped part of the tip of projection 9 may be oriented outward (FIG. 1B), but, if it is oriented inward (FIG. 1C), the effect of sealant 4 can be improved.

Embodiment 2

FIG. 2 is a partially detailed cross-sectional perspective view of a battery cell (after assembly) of Embodiment 2. The basic structure of the battery cell of Embodiment 2 is the same as that of the battery cell of Embodiment 1, and explanations of the same parts will be omitted.

Frame body 3 of frame-integrated MEA 1 is provided with projection 9 having a hook-shaped tip likewise Embodiment 1 and, furthermore, pin-shaped projection 13 for positioning is formed integrally. Furthermore, separators 11 and 12 are provided with stepped hole 10 likewise Embodiment 1 and further provided with positioning hole 14 at position corresponding pin-shaped projection 13.

Since projection 9 and stepped hole 10 are fitted together and pin-shaped projection 13 is fitted in positioning hole 14, a battery cell in which an MEA and separators are fixed in more precise positions, is formed. The hook-shaped part at the tip of projection 9 is oriented outward in FIG. 2 but may also be oriented inward.

Embodiment 3

FIG. 3 is a partially detailed cross-sectional perspective view of a battery cell (after assembly) of Embodiment 3. The basic structure of the battery cell of Embodiment 3 is the same as that of the battery cell of Embodiment 1, explanations of the same parts will be omitted.

Unlike projections 9 of Embodiment 1, projections 9 of Embodiment 3 are provided at the edges of the periphery of frame body 3 of frame-integrated MEA 1. Furthermore, separators 11 and 12 of Embodiment 3 are provided with steps 15 in the periphery so as to correspond projections 9, and there is no stepped hole which is present in Embodiment 1.

Projections 9 formed at the edges of frame body 3 are fitted with steps 15 of separators 11 and 12 so as to form an integrated battery cell. Frame body 3 is usually made of resin. Therefore, a battery cell of which entire periphery is covered with resin, is provided. If the heat efficiency of the frame body is improved by making it a high-temperature resistant component, little of the heat produced in the battery cell can escape, so that the heat can be reused. Moreover, covering the separator components can also prevent short circuit.

Embodiment 4

FIG. 4 is an exploded perspective view of a battery cell of Embodiment 4 viewed from the cathode electrode side.

A plurality of projections 9 having a hook-shaped tip are arranged consecutively on two sides 3-A in the periphery of (square-shaped) frame body 3 of frame-integrated MEA 1. Projections 9 are preferably made of a material of relatively low rigidity.

On the other hand, projections 16 (having a channel-shaped cross-section) are provided in the other two sides 3-B.

Projections 16 receive and hold the separators that can slid in perpendicular directions with respect to the stacking direction.

On the other hand, steps 15 are provided at the edges of the periphery of separator 11 and separator 12 so as to fit together with the tips of projections 9 and projections 16 of the frame.

Assembling a battery cell stack requires (1) pressing separator 11 and separator 12 into the vicinity of projection 16 of high rigidity in frame body 3 to fix their positions, and (2) further pressing the stacked separators in the stacking direction to lead projection 9 to the hook-shaped part of the tip to in steps 15 of separators 11 and 12. This makes elastically deforming projection 9 of low rigidity fit with the hook-shaped part of the tip to in steps 15 of separators 11 and 12. By this means, frame body 3 of frame-integrated MEA 1 and a pair of separators 11 and 12 are integrated to form a battery cell.

Embodiment 5

Figure 5:
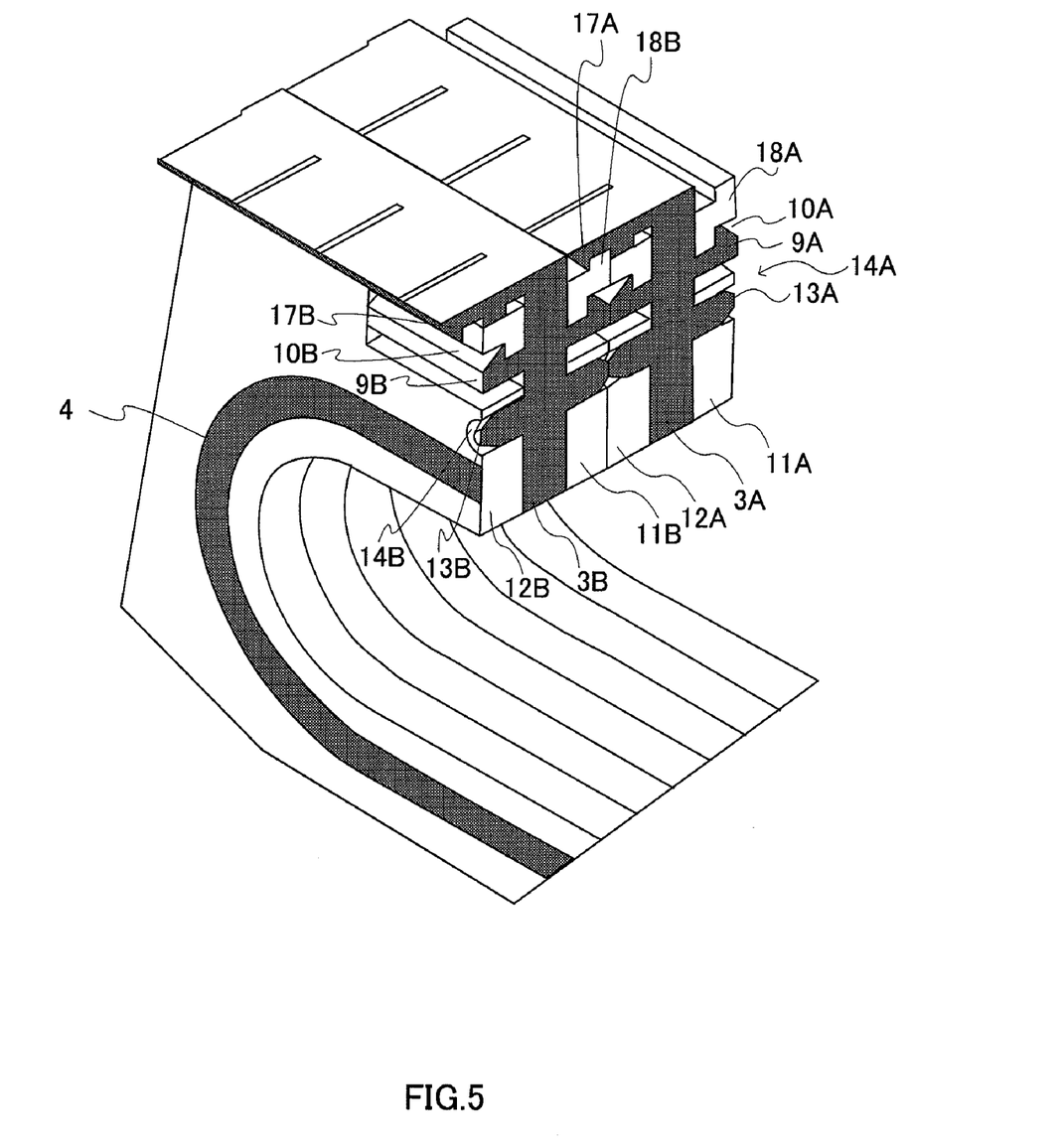
FIG. 5 is a cross-sectional perspective view of two battery cells stacked together in a fuel cell stack according to Embodiment 5, showing that the battery cells are integrated into one.

FIG. 5 is a cross-sectional perspective view of a fuel cell stack in which battery cells are stacked. In FIG. 5, two battery cells (i.e. battery cell A and battery cell B) are stacked. Battery cell A includes frame body 3A of a frame-integrated MEA and a pair of separators 11A and 12A, and battery cell B includes frame body 3B of a frame-integrated MEA and a pair of separators 11B and 12B.

Projections 9 (9A and 9B) having an hook-shaped tip are integrally provided on both planes of frame bodies 3 (3A and 3B) of each frame-integrated MEA of the battery cell and furthermore projections 17 (17A and 17B) are provided at edges of frame body 3. The tip of projections 17 is also hook-shaped, but the hook-shaped part of projections 17 is placed farther from frame body 3 than the hook-shaped part of projections 9. Moreover, pin-shaped projections 13 (13A and 13B) are provided in each frame body 3 respectively.

On the other hand, stepped holes 10 (10A and 10B) and positioning holes 14 (14A and 14B) are provided in separators 11 (11A and 11B) and in separators 12 (12A and 12B). Moreover, steps 18 (18A and 18B) are provided in the edges of the periphery of separators 11.

Projections 9 in frame body 3 are inserted in stepped holes 10 in the separators, and the hook-shaped parts of projections 9 are fitted together with the steps of stepped holes 10. On the other hand, pin-shaped projections 13 of frame body 3 are inserted into positioning holes 14 in the separators.

Moreover, according to the fuel cell stack shown in FIG. 5, the hook-shaped part of projection 17A of frame body 3A of battery cell A is fitted together with step 18B at the edge of separator 11B of battery cell B. Therefore, a fuel cell stack is obtained in which a plurality of battery cells are integrated.

Embodiment 6

FIG. 6 is a cross-sectional perspective view of a fuel cell stack obtained by stacking battery cells. Since the fuel cell stack shown in FIG. 6 has the same basic structure as that of the fuel cell stack shown in FIG. 5, explanations of the same parts will be omitted.

In FIG. 6, two battery cells (battery cell A and battery cell B) are stacked.

Integrally molded projections 9 (9A and 9B) having a hook-shaped tip are provided on both planes of frame body 3 (3A and 3B) of frame-integrated MEA of the respective battery cells and projections 17 (17A and 17B) are further provided at the edges of frame body 3. The tip of projections 17 is also hook-shaped and the hook-shaped part of projections 17 is placed farther from frame body 3 than the hook-shaped part of projections 9. Projections 17 project from both of the back plane and the front plane of the frame body and are arranged alternately on the back and front.

Moreover, each frame body 3 is provided with pin-shaped projections 13 (13A and 13B).

On the other hand, separators 11 (11A and 11B) and separators 12 (12A and 12B) are provided with stepped holes 10 (10A and 10B) and positioning holes 14 (14A and 14B). Moreover, steps 18 (18A and 18B) are provided in edges of the periphery of separators 11 (11A and 11B).

Projections 9 of frame body 3 are inserted in stepped holes 10 of the separators and the hook-shaped parts of projections 9 fit with the steps of stepped holes 10. On the other hand, pin-shaped projections 13 of frame body 3 are inserted in positioning holes 14 in the separators.

In the fuel cell stack shown in FIG. 6, projection 17A of frame body 3A of battery cell A is fitted together with projection 17B of frame body 3B of battery cell B, thereby the positions of the battery cells are fixed. Furthermore, similar to the fuel cell stack of FIG. 5, in the fuel cell stack of FIG. 6, the hook-shaped part of projection 17A of frame body 3A of battery cell A is fitted together with step 18B at the edge of separator 11B of neighboring battery cell B. Therefore, a plurality of mutually positioned battery cells is integrated.

Embodiment 7

FIG. 7 is a perspective view of a fuel cell stack (after assembly). The fuel cell stack shown in FIG. 7 includes two stacked battery cells (battery cell A and battery cell B) and an end module. The two stacked battery cells (battery cell A and battery cell B) are the same as the battery stack shown in FIG. 6, and explanations thereof will be omitted.

The end module includes gas supply/release manifold 20 and collector plate 21. Pipe 20-1 that supplies and releases the fuel gas, oxidizer gas and fluid such as cooling water to and from each battery cell, is formed integrally with gas supply/release manifold 20. Electric current can be extracted outside from the fuel cell through collector plate 21.

The end module is integrated by fitting projections 22 having a hook-shaped tip provided in gas supply/release manifold 20 with steps 23 provided in collector plate 21.

After that, by fitting the hook-shaped part at the tip of projection 17B of frame body 3B of battery cell B of a group of integrated battery cells (battery cell A and battery cell B) made up of a plurality of stacked battery cells with step 25 provided in collector plate 21, it is possible to integrate the end module and the battery cell group as a fuel cell stack.

EXAMPLES

The present invention will be explained below with more details with reference to examples, but the scope of the present invention is by no means limited to the examples described below.

Example 1

A cathode catalyst is obtained by preparing acetylene black carbon particles supporting platinum particles having an average particle size of 30 Å by 25% of the weight. Further, an anode catalyst is obtained by preparing acetylene black carbon particles supporting platinum-ruthenium alloy particles having an average particle size of 30 Å by 25% of the weight.

The cathode catalyst and anode catalyst are dispersed in isopropyl alcohol and mixed with an ethyl alcohol liquid in which perfluorocarbon sulfonic acid resin particles are dispersed, so as to obtain pastes. These pastes are applied to one side of a carbon unwoven fabric of 250 μm in thickness using a screen printing method, to form catalyst layer. In the obtained catalyst layer of each electrode, the amount of catalyst metal content is 0.3 mg/cm$^2$ and the amount of perfluorosulfonic acid content is 1.2 mg/cm$^2$.

The cathode electrode and the anode electrode are made the same structure except for the catalyst material.

A polymer electrolyte membrane is prepared, which is a perfluorosulfonic acid polymer made into a thin membrane of 30 μm and which has an area that is slightly larger than the obtained electrodes.

The obtained electrodes are placed in the central part on both sides of the polymer electrolyte membrane. A fluororubber sheet (thickness: 250 μm), from which a portion of a predetermined size is cut out, is placed on the exposed site around the perimeters of the electrodes on both sides of the polymer electrolyte membrane. These components are joined into one by hot press to make MEA.

The frame-integrated MEA and the separators having the structure explained in Embodiment 1 are prepared.

Projections having a hook-shaped tip are formed integrally in the frame body (made of polypropylene) of the frame-integrated MEA. Each of four projections having a hook-shaped tip is placed in the center of each one of the four sides of the frame body. Stepped holes having size corresponding to the projections are formed in the separators (made of a carbon material: 3 mm thick) in the positions that correspond to the projections of the frame body respectively. FIG. 9 shows the structure of the projection in the frame body and the step in the separator are shown concretely. The depth of the projection shown in FIG. 9 is 5.0 mm.

The frame-integrated MEA is sandwiched between the anode-side separator and the cathode-side separator, then the frame-integrated MEA, the anode-side separator and the cathode-side separator are pressed in the stacking direction. As a result, the hook-shaped part of the tip of the projections of the frame body is fitted with a stepped hole in the separators and locks with the step, thereby providing an integrated battery cell.

Fifty battery cells obtained this way are stacked to make a fuel cell stack. The fuel cell stack obtained is sandwiched between gold-plated copper collector plates. The fuel cell stack is further sandwiched between polyphenylene sulfide insulator plates, and this is further sandwiched between stainless steel end plates. Both endplates are fastened using fastening rods to obtain a battery stack. Here, the fastening pressure is set to 100 N/cm$^2$ per unit area of the electrodes. Power generation of the fuel cell stack obtained is evaluated.

Comparative Example 1

Figure 8:
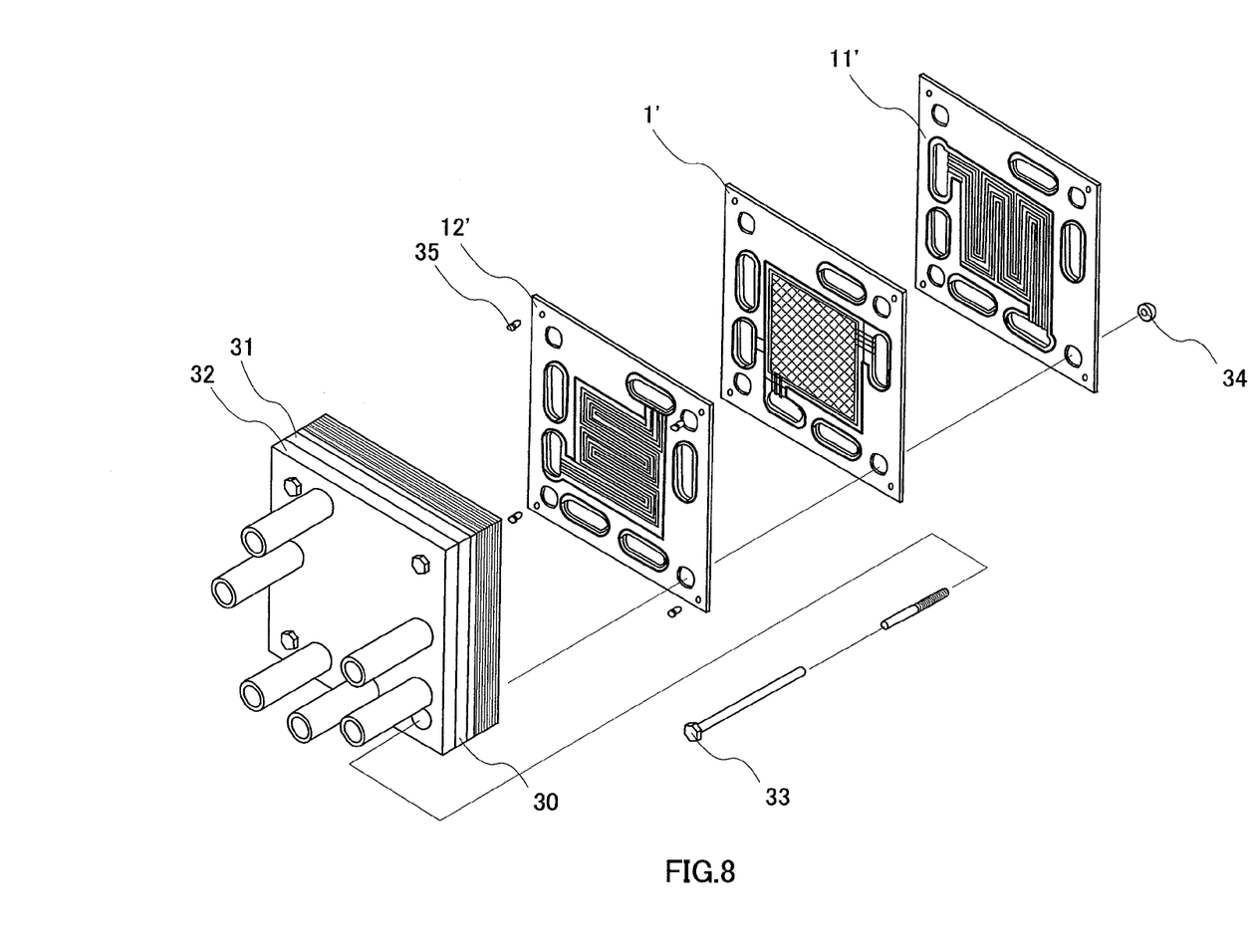
FIG. 8 is an exploded perspective view of a polymer electrolyte fuel cell of comparative example 1, showing a frame-integrated MEA, anode-side separator, cathode-side separator, end module, and fastening bolt and nut.

FIG. 8 is a perspective view of a fuel cell according to comparative example 1. The figure shows frame-integrated MEA 1', anode-side separator 11', cathode-side separator 12' and an end module (including collector plate 30, insulator plate 31, and outer end plate with pipes 32).

Frame-integrated MEA 1', anode-side separator 11' and cathode-side separator 12' are stacked together and fastened using positioning pin 35, to manufacture a battery cell. A plurality of these battery cells manufactured in this way, collector plate 30, insulator plate 31, outer end plate with pipes 32 are stacked together and then fastened using bolt 33 and nut 34.

The power generation performance of the fuel cell stack of example 1 and that of the fuel cell stack of comparative example 1 are practically equal. In example 1, the time that takes to assemble a battery cell can be reduced to approximately ⅓ of comparative example 1. Moreover, a fuel cell stack is configured without using positioning pins, fastening bolts and nuts or end plates, and therefore the manufacturing cost can be reduced by approximately 10%.

INDUSTRIAL APPLICABILITY

In the battery cell of a polymer electrolyte fuel cell of the present invention, the components of an MEA and a pair of separators are integrated in regulated positions, so that stable voltage can be produced. Moreover, since the present invention requires no special parts that are specifically dedicated for fastening use, to integrate the MEA and a pair of separators, it is possible to provide a polymer electrolyte fuel cell through simple manufacturing processes and at low cost.

The present application claims a priority based on Japanese Patent Application Laid-Open No. 2006-117590, filed on Apr. 21, 2006, the entire content of which is expressly incorporated by reference herein.

The invention claimed is:

1. A polymer electrolyte fuel cell comprising:
   a frame-integrated membrane electrode assembly including a frame body in which a gas channel opening is formed, a polymer electrolyte membrane provided inside the frame body, a pair of electrodes sandwiching the polymer electrolyte membrane, and a sealant enclosing the gas channel opening and the electrodes;
   a separator having a channel for supplying and releasing a fuel gas to and from one of the pair of electrodes; and a separator having a channel for supplying and releasing an oxidizer gas to and from the other one of the pair of electrodes, wherein:

the frame body has a plurality of projections having a hook-shaped tip on both planes of the frame body and each separator has a plurality of stepped parts; and the projections of the frame body and the stepped parts of the pair of separators are integrated by fitting together with each other.

2. The fuel cell according to claim 1, wherein the projections are located in the vicinity of the gas channel opening.

3. The fuel cell according to claim 1, wherein the hook-shaped part at the tip of the projection is oriented inward of the frame body.

4. The fuel cell according to claim 1, wherein:

a pressure of the fuel gas and a pressure of the oxidizer gas flowing through the channel of each of the separators are different; and the plurality of projections having a hook-shaped tip formed on a plane of the frame body facing the separator where a gas of a higher pressure flows, are placed further inside the frame than the plurality of projections having a hook-shaped tip formed on a plane of the frame body facing the separator where a gas of a lower pressure flows.

5. A polymer electrolyte fuel cell stack including two or more stacked fuel cells, in which each fuel cell comprising:

a frame-integrated membrane electrode assembly including a frame body in which a gas channel opening is formed, a polymer electrolyte membrane provided inside the frame body, a pair of electrodes sandwiching the polymer electrolyte membrane, and a sealant enclosing the gas channel opening and the electrodes;

a separator having a channel for supplying and releasing a fuel gas to and from one of the pair of electrodes; and a separator having a channel for supplying and releasing an oxidizer gas to and from the other one of the pair of electrodes, wherein:

the frame body has a plurality of projections having a hook-shaped tip on both planes of the frame body and each separator has a plurality of stepped parts; and the projections of the frame body and the stepped parts of the pair of separators are integrated by fitting together with each other.

6. The fuel cell stack according to claim 5, wherein:

the fuel cell stack includes a fuel cell A and a fuel cell B stacked neighboring each other;

each of the frame bodies of the fuel cell A and the fuel cell B has a plurality of second projections having a hook-shaped tip and separators of the fuel cell B has a plurality of second stepped parts; and the second projections on the frame body of the fuel cell A and the second stepped parts of the fuel cell B are integrated by fitting together with each other.

7. The fuel cell stack according to claim 5, wherein:

the fuel cell stack includes a fuel cell A and a fuel cell B stacked neighboring each other;

each of the frame bodies of the fuel cell A and fuel cell B has a plurality of second projections and a plurality of notches, said projections and notches being arranged alternately; and the second projections and notches of fuel cell A fit together with the second projections and notches of fuel cell B.

* * * * *